(12) United States Patent
Lim et al.

(10) Patent No.: US 7,486,478 B2
(45) Date of Patent: Feb. 3, 2009

(54) MAGNETIC HEAD

(75) Inventors: Chee-kheng Lim, Suwon-si (KR);
Yong-su Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 310 days.

(21) Appl. No.: 11/247,305

(22) Filed: Oct. 12, 2005

(65) Prior Publication Data
US 2006/0176613 A1 Aug. 10, 2006

(30) Foreign Application Priority Data
Feb. 7, 2005 (KR) ............... 10-2005-0011412

(51) Int. Cl.
*G11B 5/147* (2006.01)
(52) U.S. Cl. ............................. 360/126
(58) Field of Classification Search ............... None
See application file for complete search history.

(56) References Cited

U.S. PATENT DOCUMENTS 4,423,450 A * 12/1983 Hamilton ............... 360/111
6,111,724 A * 8/2000 Santini ................... 360/126
2005/0013045 A1 * 1/2005 Hasegawa et al. ........ 360/126

FOREIGN PATENT DOCUMENTS

| JP | 59-077614 | 5/1984 |
| JP | 60-164914 | 8/1985 |
| JP | 6-203337 A | 7/1994 |
| JP | 2000-251227 A | 9/2000 |

* cited by examiner

*Primary Examiner*—Mark Blouin
(74) *Attorney, Agent, or Firm*—Sughrue Mion, PLLC

(57) ABSTRACT

Provided is a magnetic head having a magnetic thin film structure that reduces the effect of a stray field and generates a magnetization reversal at a high speed. The magnetic head includes a first pole, a second pole spaced apart from the first pole, and an induction coil that induces a magnetic field in the first and second poles, wherein the first and second poles include a pole tip in which a leakage flux for recording is generated, and a head yoke that guides the flux flowing in the poles, and at least one implant for controlling a magnetic domain, the implant formed in at least one of the first and second poles. The magnetic thin film can effectively reduce the effect of a stray field entering from the outside, and can control a domain wall motion so that high speed magnetic recording is possible, by generating a magnetization reversal at a high speed corresponding to a magnetic field applied by an induction coil.

34 Claims, 15 Drawing Sheets

MAGNETIC HEAD

CROSS-REFERENCE TO RELATED PATENT APPLICATION

This application claims the benefit of Korean Patent Application No. 10-2005-0011412, filed on Feb. 7, 2005, in the Korean Intellectual Property Office, the disclosure of which is incorporated herein in its entirety by reference.

BACKGROUND OF THE INVENTION

1. Field of the Invention

Apparatuses consistent with the present invention relate to a magnetic head, and more specifically, to a magnetic head having a magnetic thin film structure that can effectively reduce an external stray field by improving the structure of the magnetic thin film of a head yoke that includes a first pole P1 and a second pole P2, and enables a high speed magnetization reversal of a head yoke for high density information recording.

2. Description of the Related Art

Much research is performed into increasing the recording density of magnetic information recording devices. High density recording requires a magnetic head design that can record data at a high speed.

FIG. 1 is a cross-sectional view illustrating a recording unit of a conventional magnetic head. As depicted in FIG. 1, a recording unit of a magnetic head 10 records a magnetic signal to a recording medium 9 using a first pole P1 and a second pole P2 to form a leakage flux that magnetizes the recording medium 9, and induction coils 5 that induce a magnetic field in the first pole P1 and the second pole P2.

Here, the characteristics of the first and second poles P1 and P2, especially their magnetic characteristics, control the quality of the magnetic field input to the recording medium 9. A recent trend is that as recording a real density increases, the bit size of the recording medium is reduced. Accordingly, the material for forming the first and second poles P1 and P2 requires a soft magnetic property having highly saturated magnetization, high permeability, low coercivity and rapid response to the applied field.

However, the poles P1 and P2 of the magnetic head 10 are also very sensitive to external magnetic fields. For example, a magnetic field (hereinafter, a stray field) generated by external magnetic generation sources other than the induction coil 5, such as a VCM that moves the magnetic head 10 over the recording medium, can enter the first and second poles P1 and P2. Therefore, efforts have been made to reduce the effect of stray fields, mainly in connection with the structure of a shield layer that shields stray fields, since any stray fields can cause recording or erasing errors.

The main difference between the writing field and the stray field is their frequency. The writing field has a very high frequency~MHz, while the stray field is almost static, that is constant with time.

On the other hand, the first and second poles P1 and P2 of the magnetic head 10 that record at high speed must be formed of a soft magnetic material in which flux is forward/reverse transformed at a high speed corresponding to a current with a high frequency. FIG. 2 is a graph showing how the magnetization M of a magnetic thin film lags behind a magnetic field H applied by an induction coil 5. In the graph, the x axis represents time and the y axis represents the magnitude of the applied magnetic field H indicated as a dotted line and the normalized magnetization M of the magnetic thin film indicated as curved lines from a1 through a6. The bold solid line a1 is a magnetization curve of the magnetic thin film corresponding to conventional first and second poles P1 and P2 according to time. Referring to the dotted line in the graph, the magnetic field H is initially applied at a magnitude of +400 kA/m and is gradually changed to a magnitude of −400 kA/m after 0.25 nanoseconds. This state is maintained for 1 nanosecond, after which the magnitude is gradually changed to +400 kA/m after 0.25 nanoseconds. The curve a1 corresponding to the dotted line lags behind the dotted line from the x axis view. When the dotted line and the curved line a1 are compared, it is seen that the magnetization M of the magnetic thin film is delayed with respect to the applied magnetic field H.

The magnetic head 10 moves relative to the recording medium 9, since the recording medium 9 rotates at a constant speed below the magnetic head 10. Therefore, a magnetic field must be formed within a specified time by supplying a current to the induction coil 5 so that the magnetic head 10 can record information on a desired location on the media. However, as depicted in FIG. 2, recording information at a high speed is difficult because the magnetization M of the first and second poles P1 and P2 lags behind the magnetic field H applied by the induction coil 5. Therefore, to record at a high speed, there is a need to redesign the magnetic head so that the magnetization reversal of the first and second poles P1 and P2 can be performed at a high speed corresponding to the high frequency current.

SUMMARY OF THE INVENTION

The present invention provides a magnetic head that effectively reduces the effect of an external magnetic field by improving the structure of a magnetic thin film of first and second poles, and can enable high speed magnetization reversal of the first and second poles for recording information at high density.

According to an aspect of the present invention, there is provided a magnetic head comprising: a first pole; a second pole spaced apart from the first pole; and an induction coil that induces a magnetic field in the first and second poles, wherein the first and second poles include a pole tip in which a leakage flux for recording is generated and a head yoke that guides the flux flowing in the poles, and at least one implant for controlling a magnetic domain, the implant formed in at least one of the first and second poles. The purpose of the implant is to control formation of the magnetic domains in P1 and P2.

The implant may have a rectangular shape.

The implant can be a first implant having a rectangular shape of which the long axis is perpendicular to the magnetic field.

At least two first implants can be arranged in at least one row parallel to the direction of the magnetic field.

A gap between the first implants in the row of first implants may be approximately equal to the width of the first implants.

The first implant can be formed in a row on a central axis of the pole, which is parallel to the direction of the magnetic field.

The first implants may be formed symmetrically on the pole with respect to the central axis of the pole, which is parallel to the direction of the magnetic field.

Furthermore, the first implants can be formed in two rows adjacent to both sides of the pole with respect to the central axis of the pole.

The second implant may have a rectangular shape of which the long axis is parallel to the magnetic field.

At least two second implants may be arranged in at least one column perpendicular to the direction of the magnetic field.

A gap between the second implants in the column of second implants may be approximately equal to the width of the second implants.

According to another aspect of the present invention, there is provided a magnetic head comprising: a first pole; a second pole spaced apart from the first pole; and an induction coil that induces a magnetic field in the first and second poles, wherein the first and second poles include a pole tip in which a leakage flux for recording is generated, and a head yoke that guides the flux gathered at the pole tip, and a first implant in a rectangular shape of which the long axis is perpendicular to the direction of the magnetic field, and a second implant in a rectangular shape of which the long axis is parallel to the direction of the magnetic field for controlling a magnetic domain formed in at least one of the first and second poles.

The first implants may be formed in the head yoke.

The first implants may be formed in a region through which the induction coil passes.

Also, the second implants may be formed in the head yoke.

The second implants may be formed in the side through which the stray field enters.

The first implants may be formed between a region in which the second implants are formed and the pole tip region.

At this time, at least two first implants can be arranged in at least one row parallel to the direction of the magnetic field.

A gap between the first implants in the row of first implants may be approximately equal to the width of the first implants.

The first implants may be formed in a row on a central axis of the pole parallel to the direction of the magnetic field.

Or, the first implants may be formed in two rows adjacent to both sides of the pole with respect to a central axis of the pole parallel to the direction of the magnetic field.

The second implants can be formed adjacent to a connection unit of the head yoke that magnetically connects the first and second poles.

At least two second implants can be arranged in at least one column perpendicular to the magnetic field.

The material for forming the implant may be a non-magnetic material or a magnetic material having a saturated magnetization Ms less than that of the head yoke.

The non-magnetic material can be $SiO_2$ or $Al_2O_3$ and the magnetic material can be NiFe, CoFe, or an alloy of Co, Fe, and Ni.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 3:
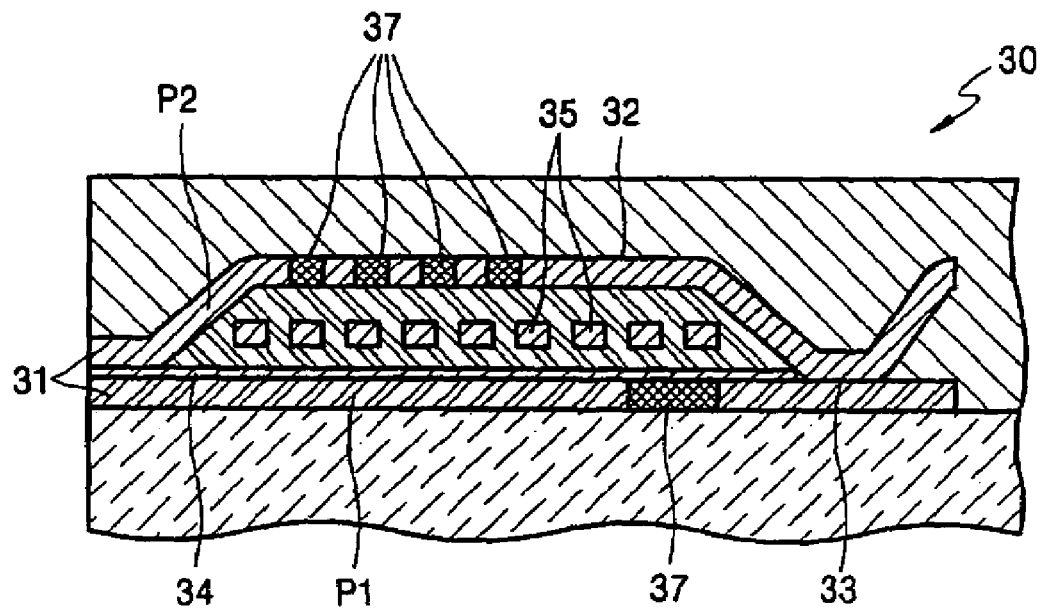
FIG. 3 is a cross-sectional view illustrating a recording unit of a magnetic head according to an aspect of the present invention.

Referring to FIG. 3, a magnetic head 30 according to the present invention comprises a first pole P1, a second pole P2 formed apart from the first pole P1, and an induction coil 35 that induces a magnetic field in the first and second poles P1 and P2. The first and second poles P1 and P2 have a pole tip 31 that generates a leakage flux for recording, and a head yoke 32 that guides the flux gathered at the pole tip 31. A rectangular shaped implant 37 for controlling magnetic domain is formed on at least one of the first and second poles P1 and P2. In FIG. 3, the implants 37 are formed on both the first and second poles P1 and P2, but only for example. That is, the implant 37 can be formed on one of the first and second poles P1 and P2, and the shape of the poles may vary according to their location.

A magnetic field induced by the induction coil 35 causes a flux by magnetizing the first and second poles P1 and P2. However, an insulating film 34 formed of a non-magnetic material formed between the first and second poles P1 and P2 makes the magnetic recording on a recording medium (not shown) by emerging from a magnetic head 30 through the pole tip 31. The flux can flow on the opposite side of the pole tip 31 through a connection unit 33 that magnetically connects the first and second poles P1 and P2.

Figure 4:
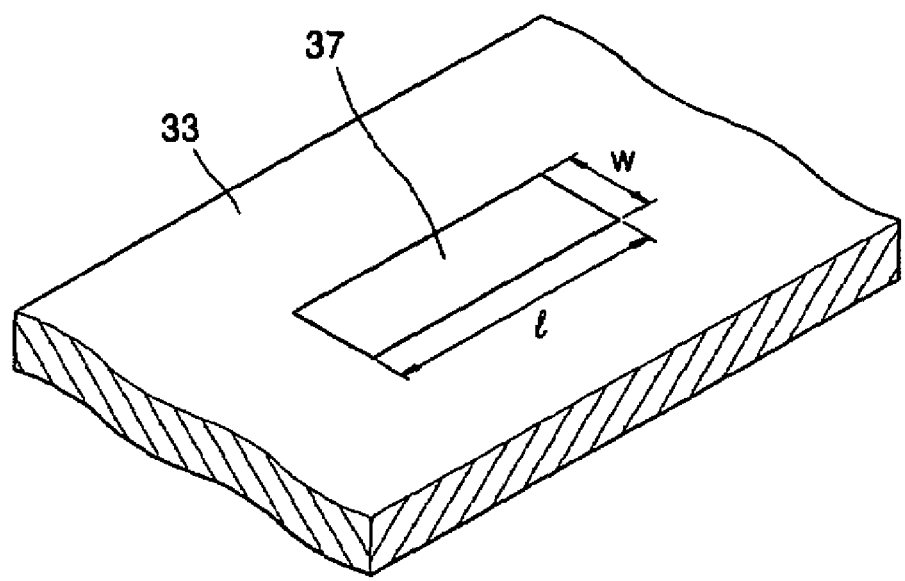
FIG. 4 is a perspective view illustrating a portion of a pole, in which an implant is formed, of a magnetic head according to an aspect of the present invention.

FIG. 4 is a perspective view illustrating a portion of a pole, in which an implant is formed, of a magnetic head according to an aspect of the present invention. As depicted in FIG. 4, the implant 37 preferably, but not necessarily, has a rectangular shape in which its length I is greater than its width w.

The thin film magnetic head 30 can be manufactured using a conventional semiconductor manufacturing method, and the implant 37 can be manufactured in a given shape through photomask and etching processes, and can be formed by depositing a non-magnetic material or a magnetic material having a lower saturated magnetization Ms than the first and second poles P1 and P2.

The material for forming the implant 37 is a non-magnetic material or a magnetic material having a lower saturated magnetization Ms than the head yoke.

If the implant 37 is formed of a non-magnetic material, this can be $SiO_2$ or $Al_2O_3$.

If the implant 37 is formed of a magnetic material, the magnetic material has a lower saturated magnetization Ms than the first and second poles P1 and P2. For example, a magnetic material having a saturated magnetization Ms of 1-1.8 T is preferable if the first and second poles P1 and P2 have a saturated magnetization Ms of 2.1-2.4 T. The magnetic material for forming the implant 37 can be NiFe, CoFe, or an alloy of Co, Fe, and Ni.

Figure 5A:
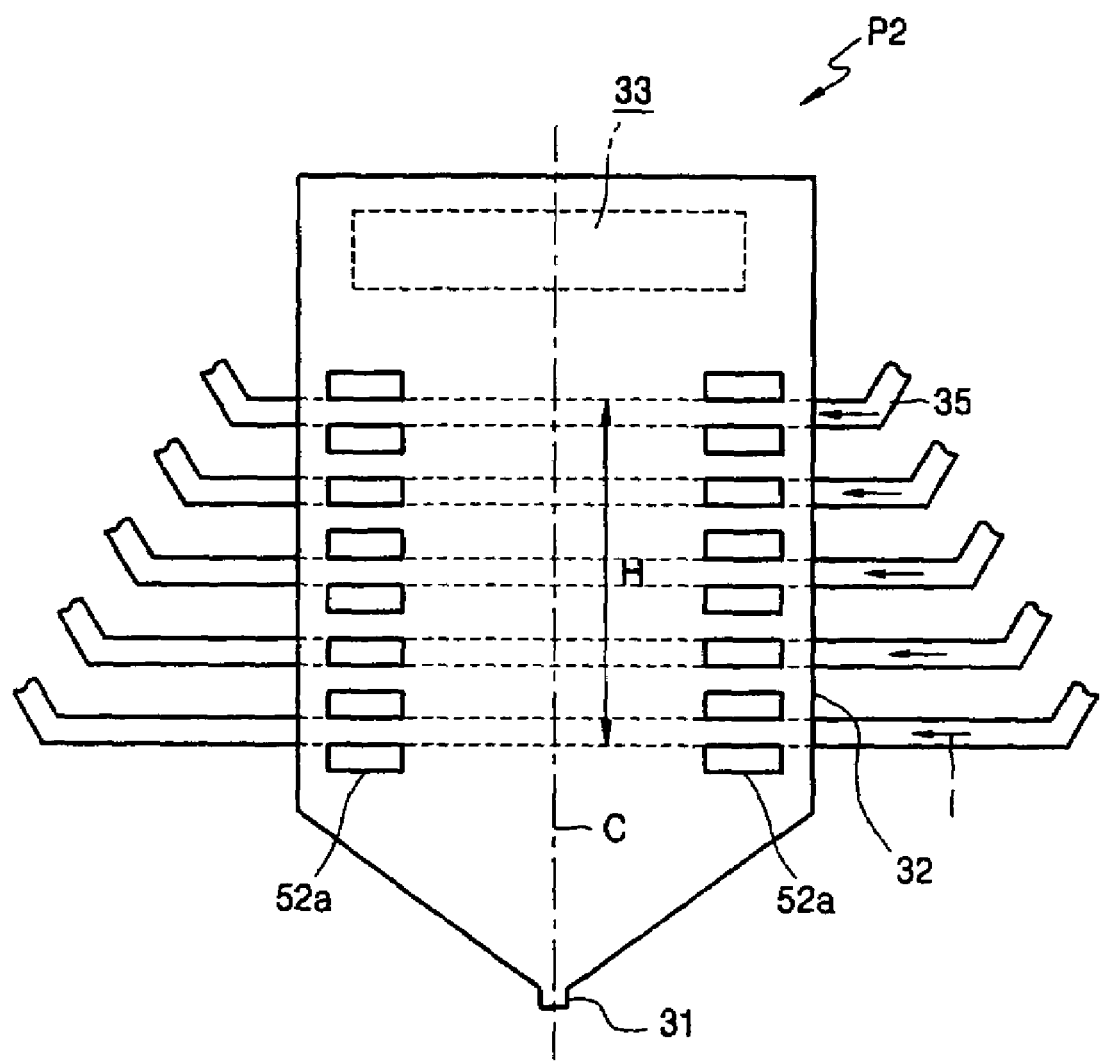
FIGS. 5A and 5B are plan views illustrating a pole of a magnetic head according to a first embodiment of the present invention.

FIG. 5A is a plan view illustrating the structure of a magnetic thin film of a second pole P2 and an induction coil 35 in a magnetic head according to a first embodiment of the present invention.

Referring to FIG. 5A, the second pole P2 is magnetized by a magnetic field H induced by a current that flows through the induction coil 35. To make a high speed magnetization reversal, a first implant 52a having a rectangular shape, of which the long axis is perpendicular to the magnetic field H, is formed close to the side edge of the second pole P2.

At least one first implant 52a is formed in the second pole P2, and preferably a plurality of first implants 52a are formed to increase the effect of magnetic domain control. The first implants 52a are preferably, but not necessarily, arranged in a row parallel to the direction of the magnetic field H induced by coil 35.

Figure 5B:
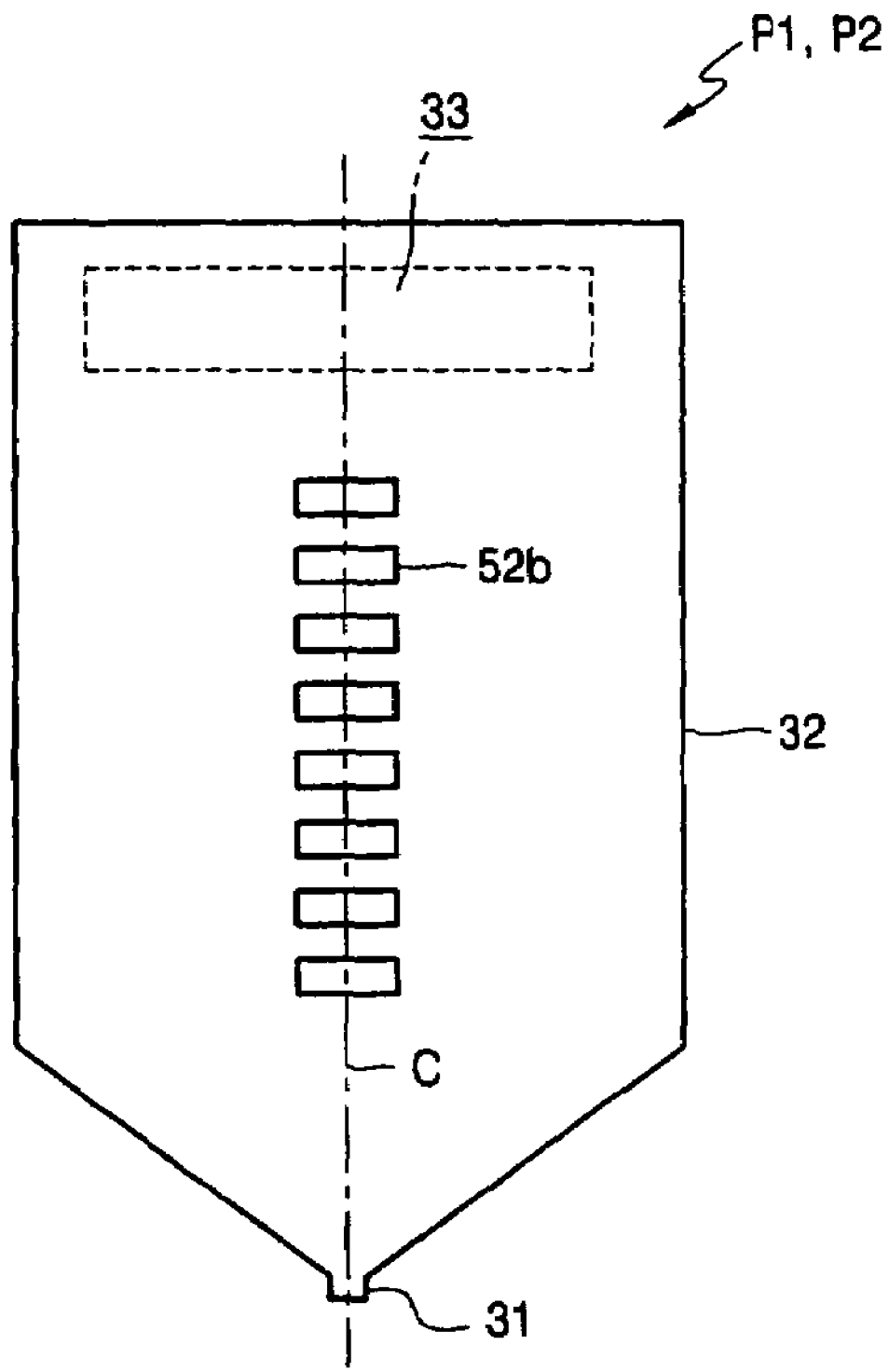

To ensure a stable magnetic domain motion of the pole by the magnetic domain control of the first implants 52a, the row of the first implants 52a is preferably, but not necessarily, formed symmetrically with respect to a central axis C of the pole, which is parallel to the direction of the magnetic field H. As depicted in FIG. 5A, the first implants 52a can be formed in two rows adjacent to both side edges of the pole with respect to the central axis C of the pole, or as depicted in FIG. 5B, the first implants 52b can be formed in a row on the central axis C of the pole. In FIG. 5A, the second pole P2 is depicted, but, in general, the first implant can also be formed in the first pole P1. Therefore, the structure of the magnetic thin film depicted in FIG. 5A can also be applied to the first pole P1.

The first and second poles P1 and P2 include a pole tip 31 in which a leakage flux for recording is generated, and a head yoke 32 that guides the flux flowing in the pole. The pole tip 31 is narrow to increase its flux density and to generate narrow recording tracks. Therefore, the first implants 52a and 52b are preferably, but not necessarily, located on the head yoke 32 which has a marginal space for controlling a magnetic domain.

Furthermore, the location on which the first implants 52a and 52b are formed is preferably, but not necessarily, a region where the induction coil 35 passes, since the purpose of the first implants 52a and 52b is to facilitate the magnetization reversal of the head yoke 32 according to the magnetic field H.

The operation of the head yoke 32 of the magnetic head 30 according to the first embodiment will now be described with reference to FIGS. 6 through 9.

The magnetic recording process of the magnetic head 30 is that the head yoke 32 is magnetized by a magnetic field induced by the induction coil 35, a flux formed by the induced magnetic field and the magnetization become a leakage flux at a gap located on the pole tip 31 of the first and second poles P1 and P2, and the leakage flux allows the magnetic head 30 to record on a recording medium. At this time, for a high speed normal/reverse transformation of the flux, the pole must be able to readily reverse its magnetization according to the induced magnetic field. The magnetization distribution with respect to a magnetic thin film on which the first implants are formed will be explained as an example to verify the relationship between the magnetization reversal of the pole and the first implants. The magnetic thin film used for the simulation has a width×length of 4×4 µm$^2$, a thickness of 100 nm, and a saturated magnetization of 2.1 T. The magnetic thin film can be interpreted as a pole, in particular a portion of a head yoke.

Figure 6:
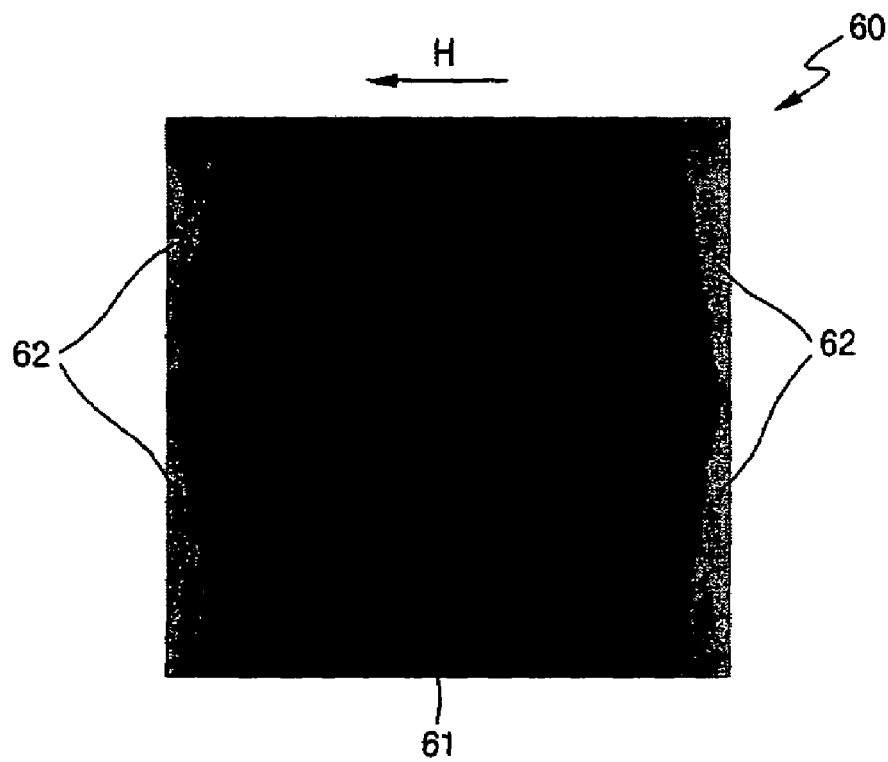
FIG. 6 shows the results of a simulation of the magnetization distribution during a magnetization reversal of a conventional magnetic thin film.

FIG. 6 shows a magnetization distribution of the magnetic thin film 60 at the moment of changing the direction of magnetization by applying an external magnetic field H toward the left direction, which is the opposite direction to the magnetization direction of the magnetic thin film 60 which is magnetized in the right direction. In FIG. 6, a first region 61 which is a wide central region is magnetized in the right direction, but second regions 62 which are side portions of the magnetic thin film are magnetized close to the vertical direction due to the demagnetizing field effect. When an external magnetic field is applied, the second regions 62 will experience the strongest torque from the field due to the large angle between the magnetic field and magnetic moment in regions 62. Therefore, it can be said that the magnetization reversal of the magnetic thin film 60 begins at the second regions 62.

The simulation result of FIG. 6 can be understood as follows. The direction of magnetic moment in a magnetic domain is formed in order to minimize the magnetostatic energy. That is, when an external magnetic field is applied, the magnetic moment of the magnetic thin film rotates toward the direction of the external magnetic field. The magnetic moment rotation is especially easy at boundary regions which are perpendicular to the applied external magnetic field H. That is, the second regions 62 of the magnetic thin film 60 are boundary regions which are perpendicular to the external magnetic field H, and the magnetic moment rotation begins readily in these regions for the magnetization reversal of the magnetic thin film 60, as a result of the torque from the magnetic field. That is, the boundary region perpendicular to the external magnetic field H such as the second region 62 acts as a nucleator of magnetic domains for the magnetization reversal.

Accordingly, to change the direction of the magnetization direction at a high speed with respect to an external magnetic field H, it is necessary to form many boundaries perpendicular to the external magnetic field H. For this purpose, a first implant having a rectangular shape, of which the long axis is perpendicular to the external magnetic field H, is formed on the magnetic thin film.

Figure 7A:
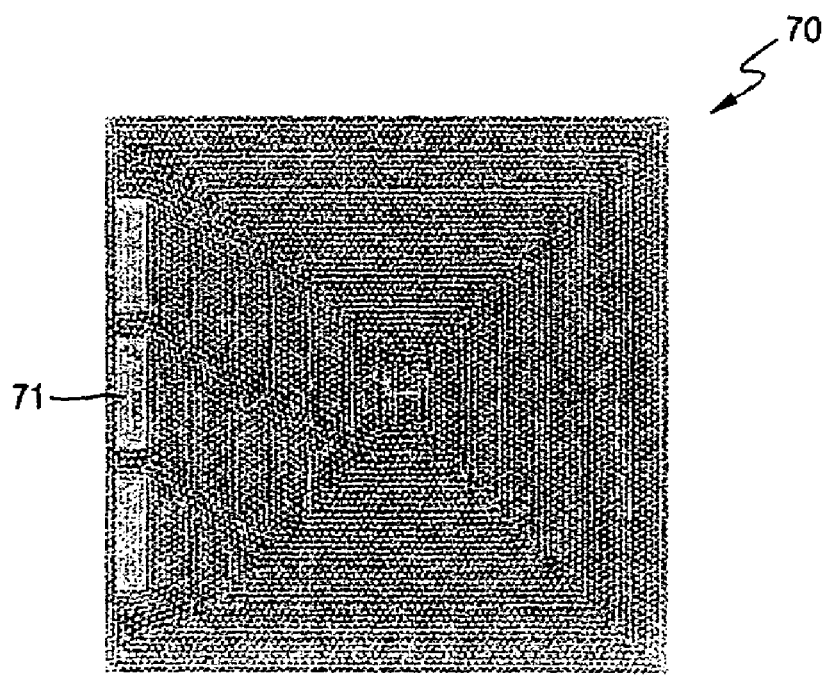
FIGS. 7A through 8C are drawings showing a magnetic thin film on which first implants are formed and the results of a simulation of the magnetization distribution during magnetization reversals thereof.
Figure 7B:
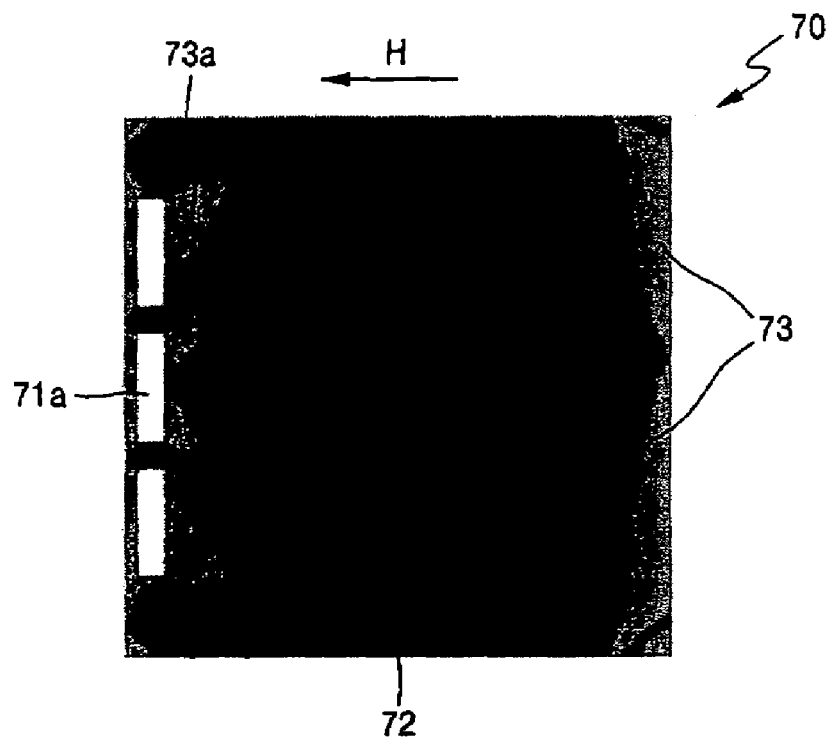
Figure 7C:
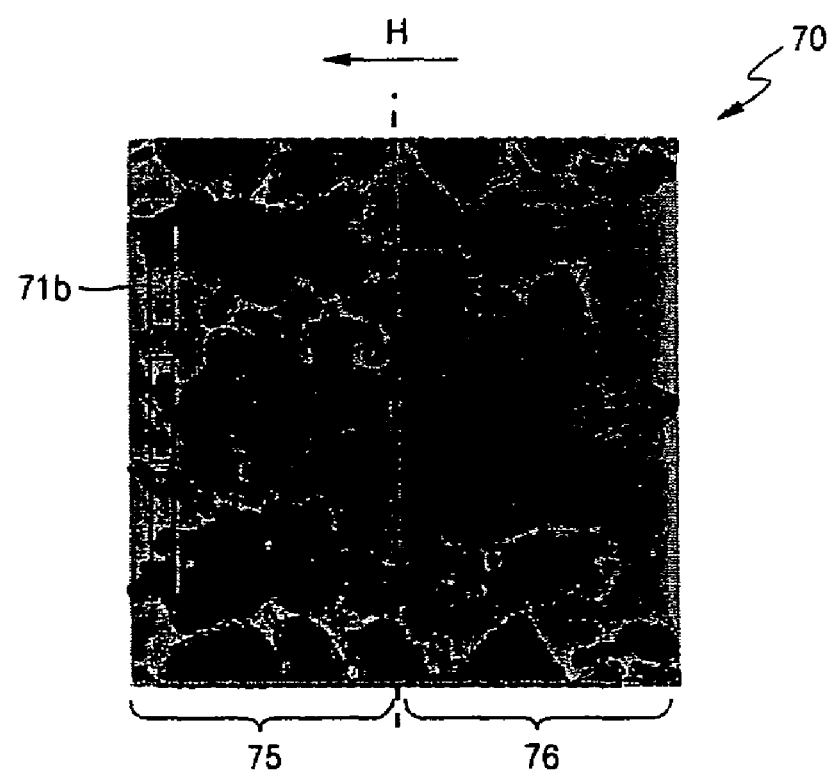

FIG. 7A shows a magnetic thin film 70 in which three first implants 71 are arranged lengthwise in a row on one side of the film. In FIGS. 7B and 7C, the magnetization distributions of the magnetic thin film 70 at the beginning of the magnetization reversal and during the magnetization reversal are depicted. FIG. 7B is the result of a simulation using a first implant 71a formed of a non-magnetic material, and FIG. 7C is the simulation result using a first implant 71b of the magnetic thin film 70 formed of a magnetic material having a lower saturated magnetization Ms than the head yoke.

The gaps between the first implants 71 are adjusted to approximately the same as the widths of the first implants 71. When an external magnetic field H is applied to the magnetic thin film 70 perpendicular to the long axis of the first implant 71, the boundary regions perpendicular to the external magnetic field H are increased when compared to the magnetic thin film 60 in FIG. 6. Therefore, it is anticipated that the magnetization reversals progress actively at the boundary regions on the side of the films where the first implants are formed. That is, when the external magnetic field H is interpreted as a magnetic field applied by an induction coil of a magnetic head, it is denoted that a pole having a magnetic thin film structure in which the first implant is formed can undergo magnetization reversals at high speed.

The reason why the first implant 71 must be formed of a non-magnetic material or a magnetic material having a saturated magnetization Ms less than that of the head yoke is that the aim of the first implant 71 is to increase the boundary regions perpendicular to the external magnetic field H. For example, with respect to a pole formed of a magnetic material having a saturated magnetization Ms of 2.1-2.4 T, the first implant 71 can be formed of a magnetic material having a saturated magnetization Ms of 1-1.8 T. Also, to best increase the boundary regions, the first implant 71 is rectangular and its length is preferably formed greater than its width.

FIG. 7B shows the magnetization distribution of the magnetic thin film 70 at the beginning of changing the magnetization direction, when an external magnetic field H is applied to the magnetic thin film 70 in a left direction which is the opposite direction to the magnetization direction of the magnetic thin film 70 which is initially magnetized in a right direction. In FIG. 7B, a first region 72, which is a wide central region, is magnetized in the right direction 74, but second regions 73 adjacent to the sides of the magnetic thin film 70, which are magnetized nearly perpendicular to an external magnetic field H, show that the magnetization of the second regions 73 begins to reverse by magnetic moment rotation. When FIG. 7B is compared to FIG. 6, the second regions are further expanded to side boundary regions 73a of length direction of the first implant 71 located on the left-hand side of the magnetic thin film 70. This denotes that the magnetic moment rotation is further activated.

FIG. 7C shows the magnetization distribution of FIG. 7B after a period of time has passed. As seen in FIG. 7B, the magnetic domain of the left region 75 of the boundary region of length direction of the first implant 71b reverses quickly, and as a result, a large amount of reverse magnetized magnetic domain 77 having a magnetic moment in the same direction as the external magnetic field H is formed. On the other hand, in the right region 76 of the magnetic thin film 70, a relatively smaller amount of reverse magnetized magnetic domain 77 is found due to a slow magnetization reversal.

From the result of the magnetization reversals described with reference to FIGS. 7B and 7C, the first implant 71 depicted in FIG. 7A acts as a nucleator of magnetic domain formation for magnetization reversal at high speed.

Figure 8A:
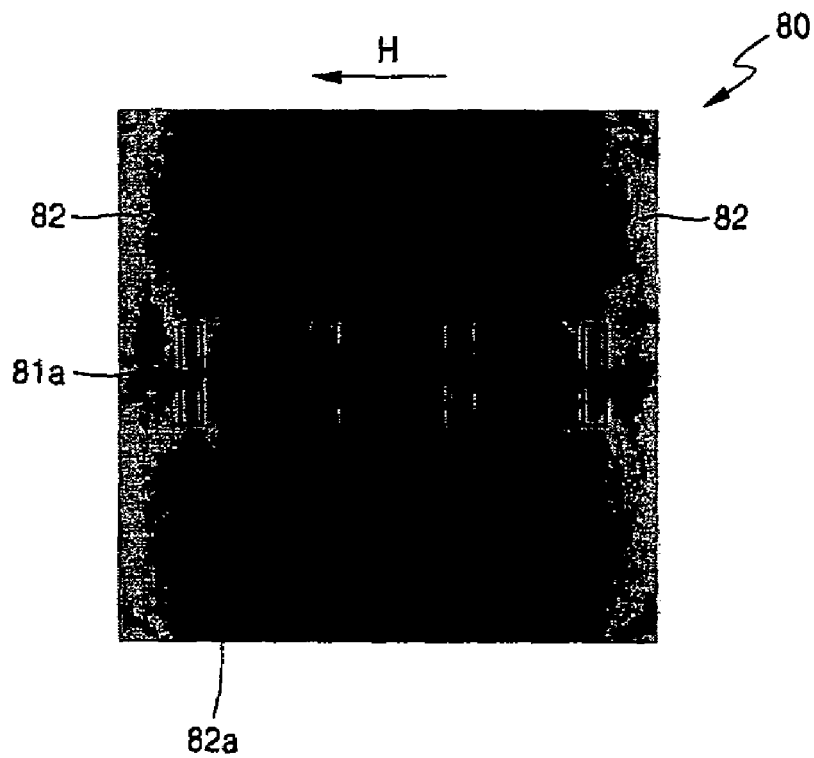
Figure 8B:
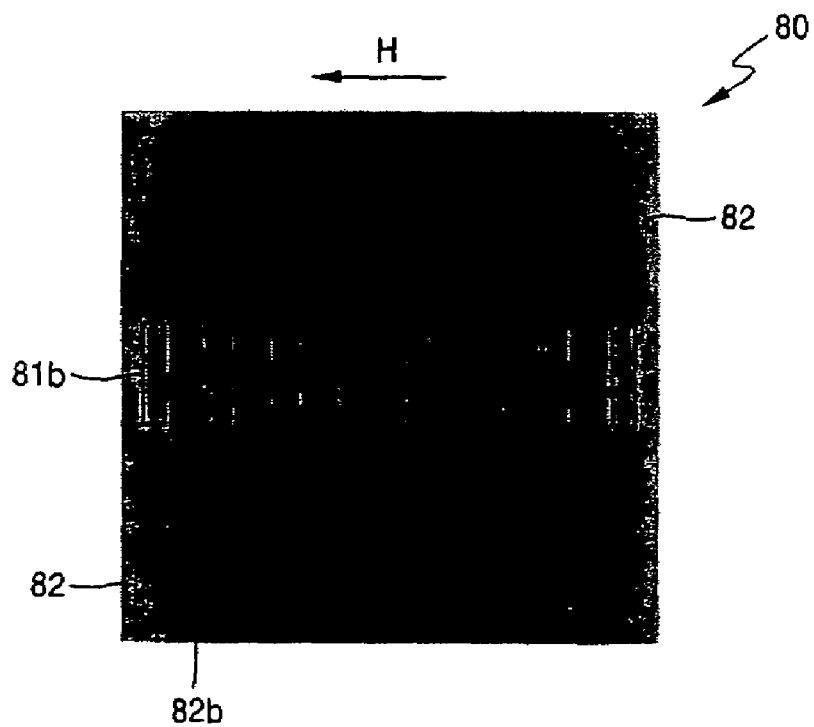
Figure 8C:
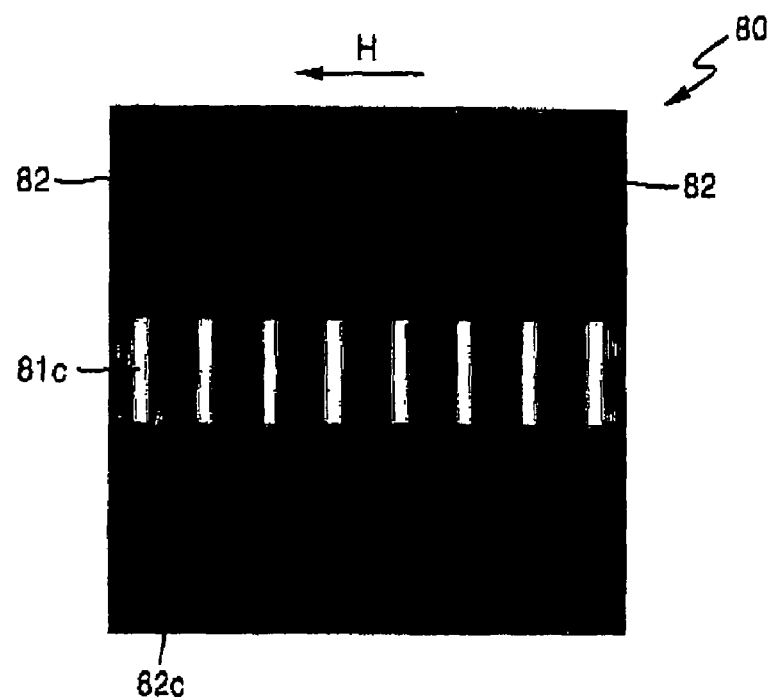

FIGS. 8A through 8C show the results of a simulation of the magnetization distribution when first implants 81a and 81b are formed in the center of a magnetic thin film. FIG. 8A shows the case where four first implants 81a formed of a magnetic material are arranged in the central portion of a magnetic thin film, FIG. 8B shows the case where eight first implants 81b formed of a magnetic material are densely arranged in the central portion of a magnetic thin film, and FIG. 8C shows the case where eight first implants 81c formed of a non-magnetic material are arranged in the central portion of a magnetic thin film.

The simulations in FIGS. 8A through 8C show the magnetization distributions of the magnetic thin film 80 at the moment of changing the direction of magnetization by applying an external magnetic field H to the magnetic thin film 80 in a left direction, which is the opposite direction to the initially magnetized direction of the magnetic thin film 80 which is magnetized in a right direction 83. In the above simulation, it is observed that the magnetic moment rotation begins at side boundary regions 82a, 82b, and 82c of length direction of the first implant 81a, 81b, and 81c besides side regions 82 of the magnetic thin film 80. In this manner, the magnetization reversal of the magnetic thin film 80 can be performed at a high speed due to the magnetic moment rotation that accelerates the magnetic domains formation by the first implants.

Especially, as depicted in FIGS, 8B and 8C, more nucleators for the magnetization reversal are generated in the magnetic thin film 80 on which more of the first implants 81c are formed. That is, the formation of a plurality of the first implants on a magnetic thin film is advantageous for the magnetization reversal. At this time, to form more of the first implants, their width and spacing are reduced. In consideration of the limitations of the manufacturing process, the width may be similar to the spacing when they are reduced to their minimum.

The simulations in FIGS. 8A and 8B are cases where the first implants 81a and 81b are formed of a magnetic material having a saturated magnetization Ms less than that of the magnetic thin film 80, and the simulation in FIG. 8C is a case where the first implant 81c is formed of a non-magnetic material and has a magnetization distribution substantially similar to that of the simulations in FIGS. 8A and 8B.

Figure 1:
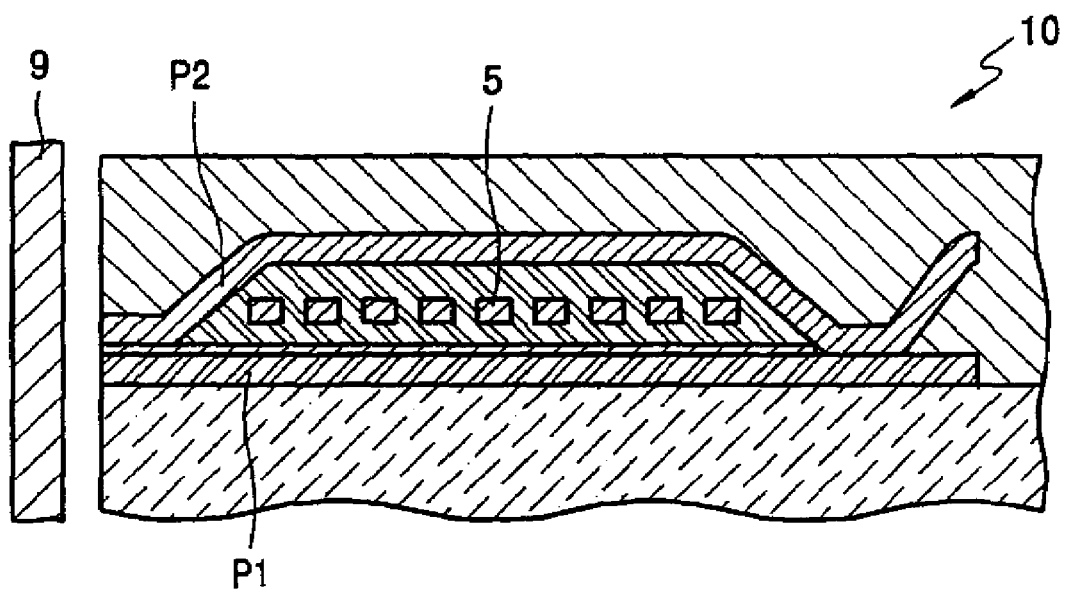
FIG. 1 is a cross-sectional view illustrating a recording unit of a conventional magnetic head.
Figure 2:
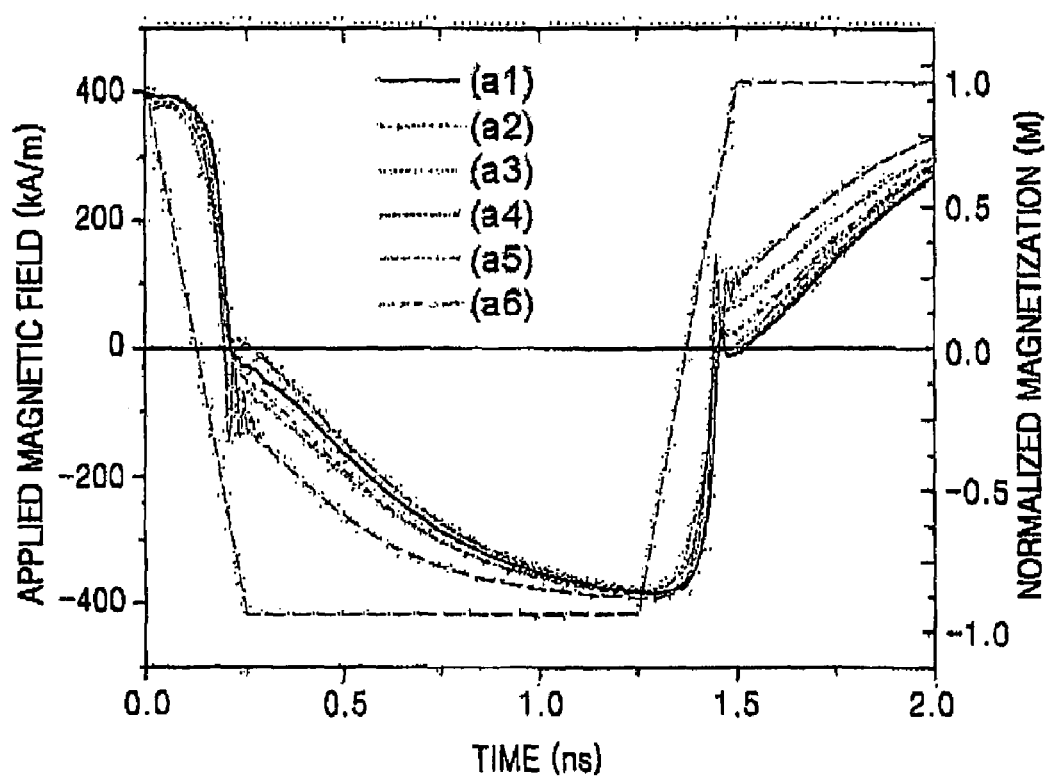
FIG. 2 is a graph showing how the temporal behavior of magnetization M of a magnetic thin film lags the magnetic field H applied by an induction coil.
Figure 9:
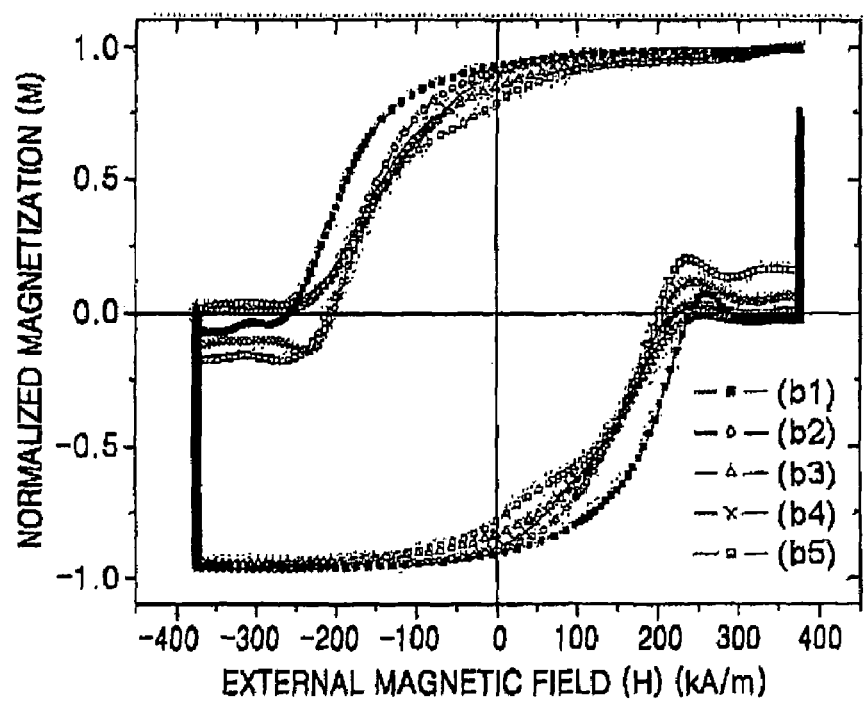
FIG. 9 is a graph showing magnetization curves of a magnetic thin film on which first implants are formed.

When the first implants are formed on a magnetic thin film as described above, the magnetization reversal at a high speed corresponding to an external magnetic field H can be clearly seen through FIGS. 2 and 9.

As described above, FIG. 2 is a graph showing the lag of magnetization H of a magnetic thin film with respect to a magnetic field applied by an induction coil 5. Of the curves a1 through a6, a1 represents the progress of magnetization of a conventional magnetic thin film, and curves a2, a5, and a6 represent the progress of magnetization of a magnetic thin film on which first implants according to the present invention are formed. The curves a2, a5, and a6 are closer to the dotted line that represents an external magnetic field than the curve a1, which denotes that the magnetization reversal of a magnetic thin film on which the first implants are formed is faster than that of a conventional magnetic thin film.

This fact is also proved in magnetization curves depicted in FIG. 9, where a magnetic thin film on which the first implants are formed has small coercivity.

In FIG. 9, the horizontal axis represents the magnitude of an external magnetic field H, and the vertical axis represents the magnitude of normalized magnetization M. Curves b1 through b5 are magnetization curves that indicate the degree of magnetization of a magnetic thin film according to an external magnetic field H applied to the magnetic thin film. The curve b1 is a magnetization curve of a magnetic thin film on which the first implants are not formed, and the curves b4 and b5 are magnetization curves of magnetic thin films on which the first implants according to the present invention are formed.

The magnitude of an external magnetic field H at a crossing point between the magnetization curve and a horizontal line is called the dynamic coercivity since the magnetic field was applied at very high frequency. This is to imitate the writing frequency of the magnetic head. The coercivity of a magnetic thin film on which the first implants are formed is less than the coercivity of a conventional magnetic thin film. In this manner, the coercivity is reduced when the first implants are formed on a magnetic thin film, and accordingly, the magnetization reversal easily takes place with a smaller external magnetic field H. Therefore, it is clear that the first implants accelerate the magnetization reversal of a magnetic thin film. This can also be taken as a method to reduce power consumption in the magnetic head since less magnetic field is required for reversing the poles.

The magnetic thin film can be regarded as a pole of a magnetic head. Therefore, when first implants are formed on a pole to be magnetized according to a magnetic field applied by an induction coil, the magnetization reversal of the pole can be performed at a higher speed than with a conventional pole. Accordingly, a magnetic head according to the present invention can make a magnetic recording at high density.

Figure 10:
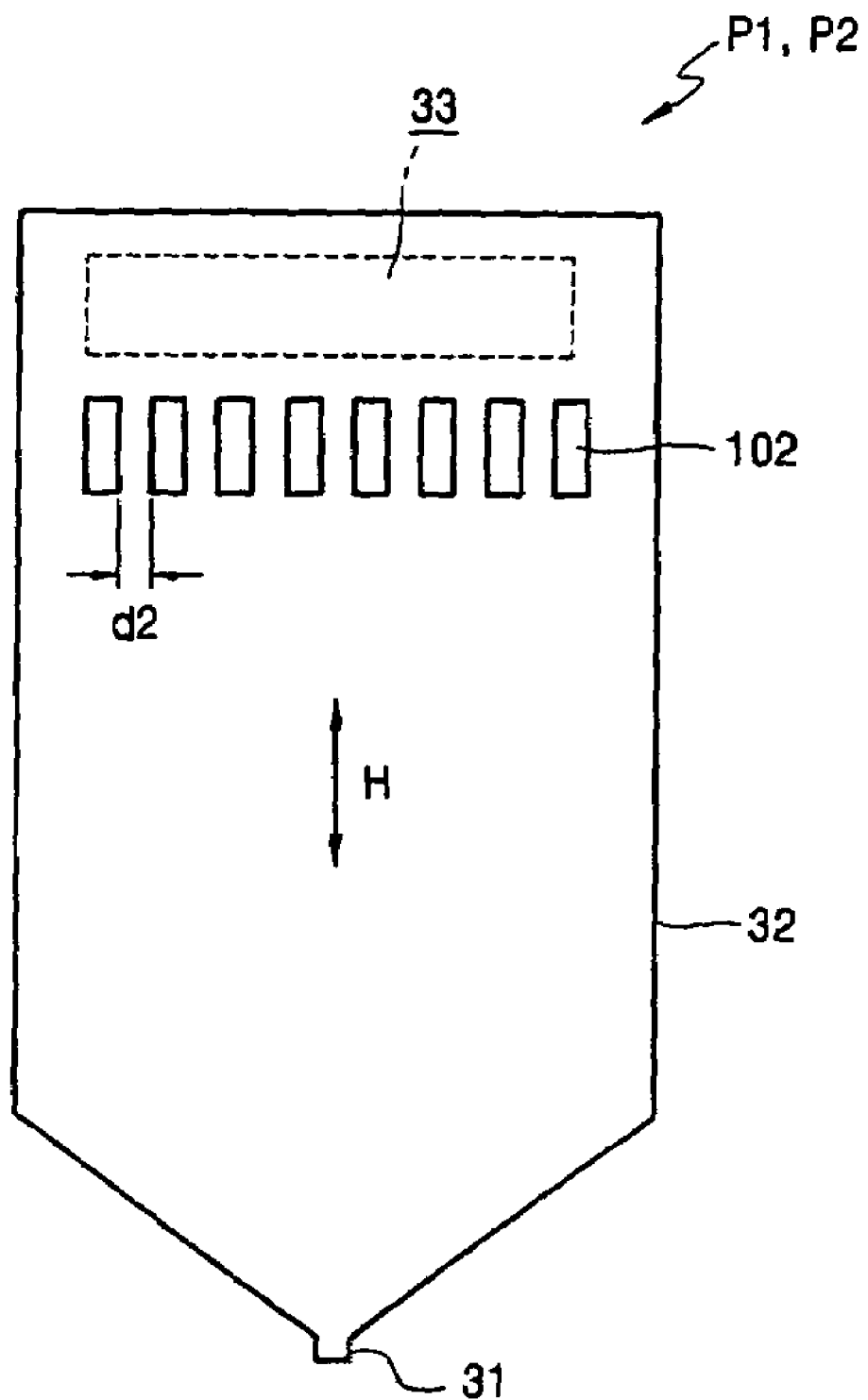
FIG. 10 is a plan view illustrating a pole of a magnetic head according to a second embodiment of the present invention.

FIG. 10 is a plan view illustrating poles P1 and P2 of a magnetic head according to a second embodiment of the present invention.

Referring to FIG. 10, second implants 102 in a rectangular shape of which the long axis is parallel to a magnetic field applied by an induction coil (not shown) are formed at the top edge of the pole to reduce the effect of a stray field. At least two second implants 102 are preferably, but not necessarily, arranged in at least one column perpendicular to the magnetic field H.

A gap d2 between the second implants 102 in the column of the second implants 102 is preferably, but not necessarily, approximately equal to the width of the second implants 102.

Also, the second implants 102 are preferably, but not necessarily, formed in the head yoke 32, in the side through which the stray field enters, that is the top end of P1 and P2, since a purpose of the second implants 102 is to reduce the effect of the stray field. The stray field generally does not have a specific direction but is assumed to have the same direction as the induced magnetic field H applied by an induction coil (not shown) in the present embodiment. This is because the stray field having the same direction as the induced magnetic field H causes recording errors when mixed with the induced magnetic field H through a pole tip. The side through which the stray field enters indicates the opposite side of the pole tip. As an example, the second implants 102 can be formed adjacent to a connection unit 33 of the head yoke 32 at which the first pole P1 and the second pole P2 are magnetically connected.

The operation of the magnetic head according to the second embodiment will now be described with reference to FIG. 10. A magnetic field applied by an induction coil (not shown) magnetize P1 and P2. A magnetic flux formed by the induced magnetic field becomes a leakage flux at a pole tip 31 placed at the end of the first and second poles P1 and P2, and the leakage flux allows the magnetic head to record magnetically on a recording medium (not shown). However, a stray field can exist in the flux flowing through the first and second poles P1 and P2, as well as the induced magnetic field and the magnetization generated by the induced magnetic field, since the stray field generated by an external source enters from the connection unit 33 of the first and second poles P1 and P2. Second implants are formed on the first and second poles P1 and P2 to reduce the effect of the stray field.

The relationship between the reduction of the effect of a stray field and the second implants will now be described with reference to FIGS. 11A and 11B.

Figure 11A:
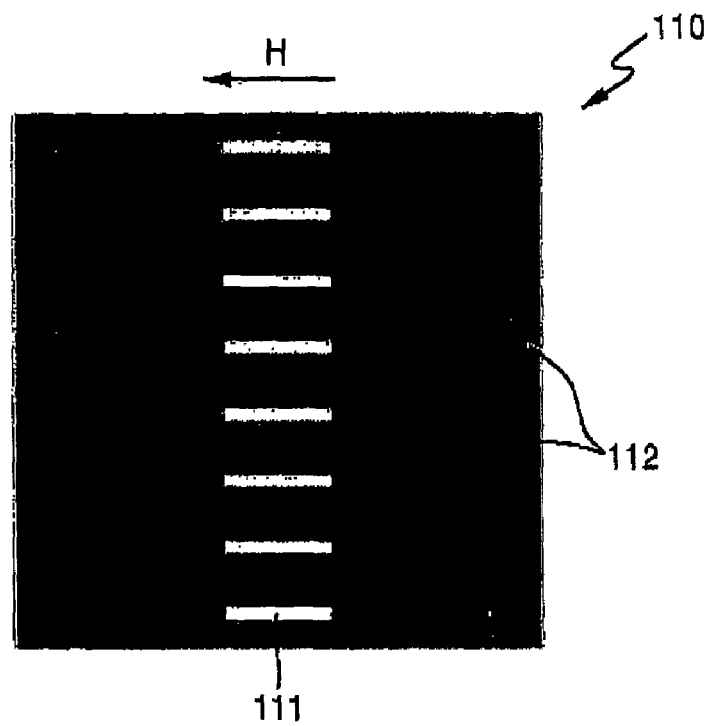
FIG. 11A is a plan view of a magnetic thin film on which second implants are formed.

FIG. 11A shows the magnetization distribution at the beginning of the magnetization reversal of a magnetic thin film 110 by applying an external magnetic field H parallel to the long axis of the second implants 111 to the magnetic thin film 110 on which the second implants 111 are formed.

Eight of the second implants 111 of which the long axis is parallel to the external magnetic field H are formed in a central portion of the magnetic thin film 110. If an external magnetic field H is applied to the magnetic thin film 110 parallel to the long axis of the second implants 111, the magnetic thin film 110 begins its magnetization reversal from regions 112 having a boundary perpendicular to the external magnetic field H. However, the magnetization reversal of a magnetic domain having a magnetic moment parallel to the external magnetic field H and adjacent to a side of a length direction of the second implants 111 is not easy because there is no torque acting on the magnetic moment parallel to the external field. This is confirmed from the fact that regions adjacent to sides of the length direction of the second implants 111 maintain the initial magnetization direction 113. It can be interpreted that the second implants 111 perform the role of preventing the motion of magnetic domain with respect to the change of a magnetic field H entering from the outside. The role of the second implants 111 is to increase the boundary parallel to the external magnetic field H. Therefore, the second implants 111 must be a non-magnetic material or a magnetic material having a lower saturated magnetization Ms than the head yoke 32. For example, the second implants 111 can be formed of a magnetic material having a saturated magnetization Ms of 1-1.8 T with respect to a pole formed of a magnetic material having a saturated magnetization Ms of 2.1-2.4 T. Also, to increase the boundary parallel to the external magnetic field H, the second implants 111 can be formed in a rectangular shape in which their length is greater than their width. Furthermore, the magnetic domain near the boundary to the width side of the second implants 111 is preferably, but not necessarily, formed as narrow as possible since the magnetization reversal of the magnetic domain is easy because it is perpendicular to the external magnetic field H. On the other hand, the second implants 111 are preferably, but not necessarily, numerous, since this allows the magnetic domain motion to be prevented over a wider region. The gap d2 (see FIG. 10) between the second implants 111 can be similar to the width of the second implant 111, since there are limits in the manufacturing process.

The role of the second implants 111 will be described further with reference to FIG. 11B. FIG. 11B is a graph of magnetization curves showing the degree of magnetization M of a magnetic thin film according to an external magnetic field H applied to the magnetic thin film. The horizontal axis of the graph represents the magnitude of an external magnetic field H, and the vertical axis of the graph represents the magnitude of the normalized magnetization M. Curve c1 is a magnetization curve of a conventional magnetic thin film, and curves c2 through c8 are magnetization curves of a magnetic thin film on which the second implants according to the present invention are formed.

Figure 11B:
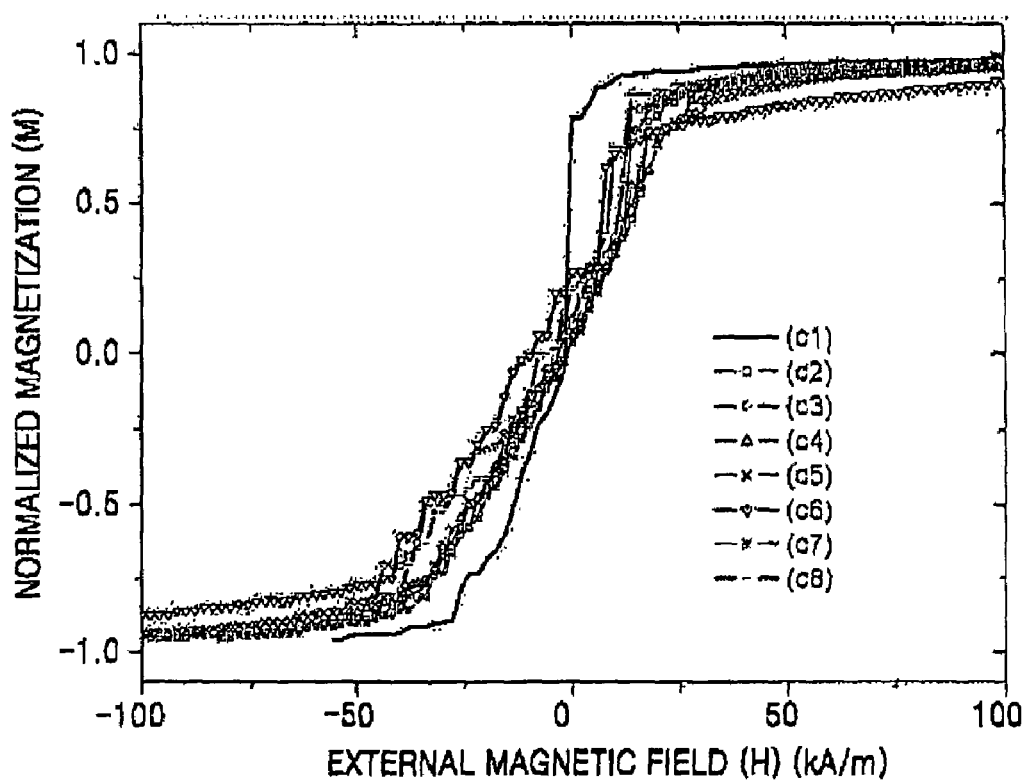
FIG. 11B is a graph showing magnetization curves of a magnetic thin film on which second implants are formed.

FIG. 11B shows the magnetization reversal of the magnetic thin film from +1.0 to −1.0 when a magnetic field that changes from +200 kA/m to −200 kA/m is applied to the magnetic thin film initially magnetized to 1.0. Curves c2 through c8 have a less steep slope than curve c1, and this denotes that the magnetization reversal of the magnetic thin film on which the second implants are formed is less sensitive to the external magnetic field H compared to a magnetic thin film without the second implants. In this case, the magnetic field is applied at a very low frequency, in order to imitate the behavior of the stray field. FIG. 11B also shows that the magnetic anisotropy of c2 to c8 has increased due to the second implants compared to c1 without any implants.

At this time, if the external magnetic field H is a stray field, the magnetic thin film in which the second implants are formed is less sensitive to the stray field.

In the above simulation, the effect of the stray field on a head yoke can be reduced by forming the second implants in the head yoke where external stray field is likely to enter the magnetic head, since the external magnetic field H can be interpreted as a stray field.

A magnetic head according to a third embodiment of the present invention includes a first pole P1, a second pole P2, and an induction coil that induces a magnetic field in the poles. Also, the magnetic head includes first implants in a rectangular shape of which the long axis is perpendicular to the magnetic field, and second implants in a rectangular shape of which the long axis is parallel to the magnetic field, to control magnetic domains in at least one of the first pole P1 and the second pole P2.

The first and second implants are preferably, but not necessarily, formed in a head yoke that guides a flux induced by the induction coil. The first implants are more preferably, but not necessarily, formed adjacent to the side edges and the second implants are formed at the top edge of the poles P1 and P2.

The shapes and materials for forming the first and second implants are the same as in the previous descriptions. The locations of the first and second implants are identical to those in the first and second embodiments. Therefore, their descriptions will not be repeated.

A magnetic head having the structure of the magnetic thin film according to the third embodiment of the present invention will now be described with reference to FIGS. 12A through 14B.

Figure 12A:
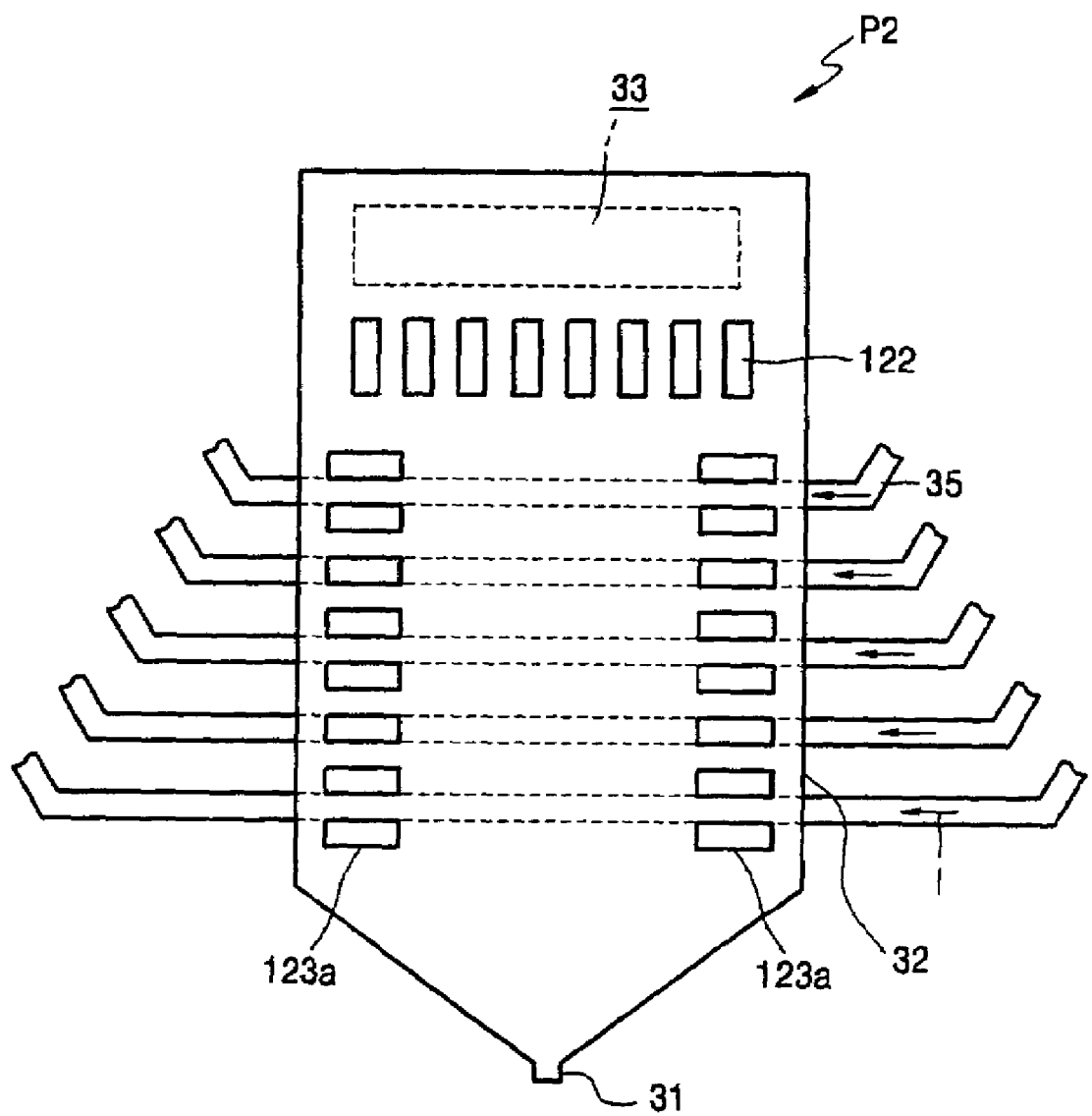
FIGS. 12A and 12B are plan views illustrating a pole of a magnetic head according to a third embodiment of the present invention.
Figure 12B:
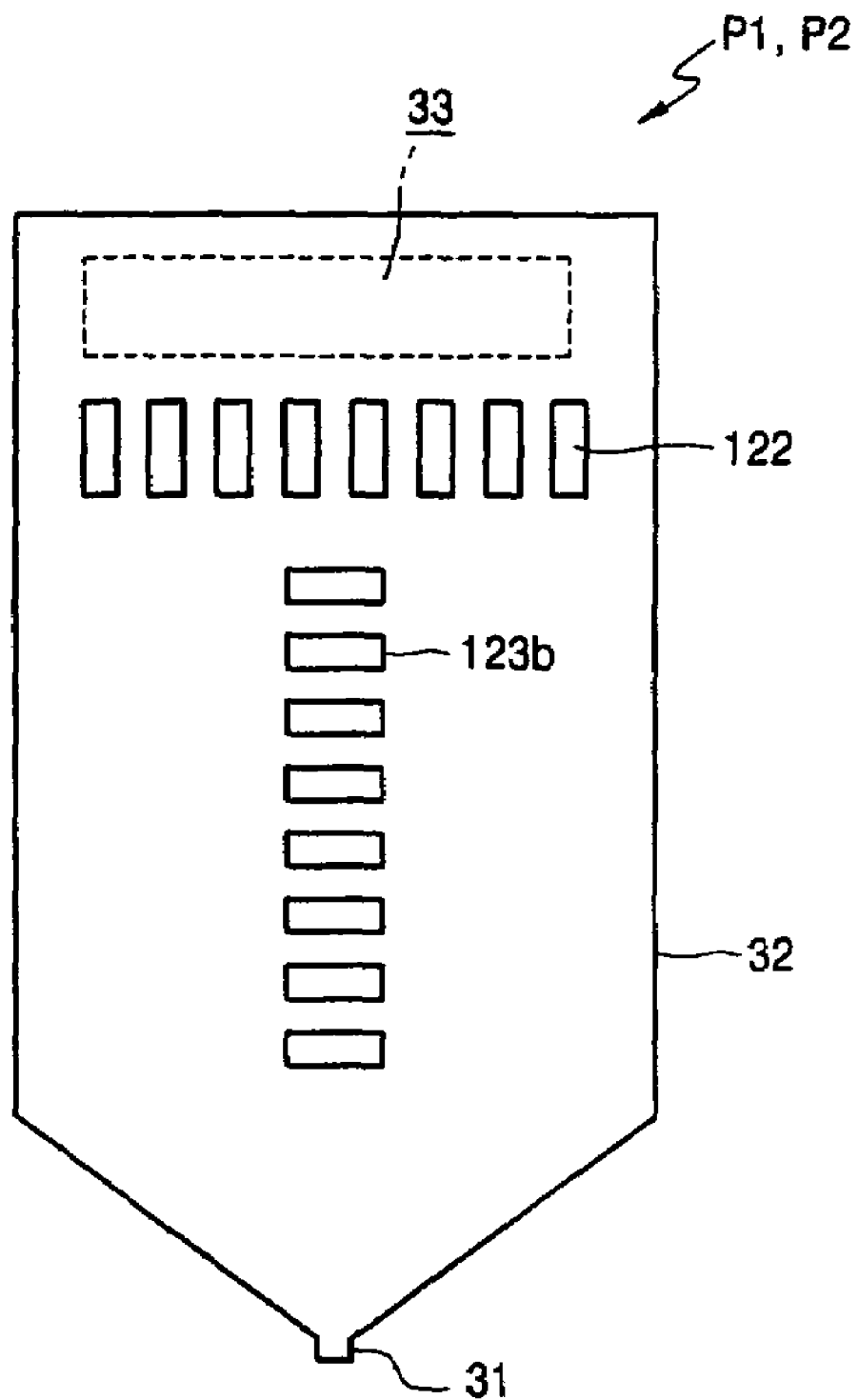

FIGS. 12A and 12B are plan views showing the locations of a second pole P2 and induction coils 35 in a magnetic head, to describe the structure of the magnetic thin film according to the third embodiment. In FIG. 12A, only the second pole P2 is depicted, but the layout can also be applied to a first pole P1 since the second implants can be formed in the first pole P1.

In the second pole P2 depicted in FIG. 12A, a plurality of second implants 122 are formed in a column adjacent to a connection unit 33 that connects the first pole P1 and the second pole P2. The first implants 123a are formed in two rows adjacent to both side edges of the second pole P2 with respect to a central axis parallel to the magnetic field H. The arrangements of the first and second implants 123a and 122 depicted in FIG. 12A are illustrative examples. As depicted in FIG. 12B, the first implants 123b can be arranged in a row along the central axis of the first and second poles P1 and P2, and other arrangements are also possible. However, the second implants 122 are preferably, but not necessarily, formed farther from the pole tip 31 than the first implants 123a, close to the top edge of the pole, since a purpose of the second implants is to reduce the effect of the stray field, which is most likely to enter at the top portion of the pole.

The magnetization distribution of a magnetic head on which the first and second implants together are formed will now be described with respect to an external magnetic field H.

Figure 13A:
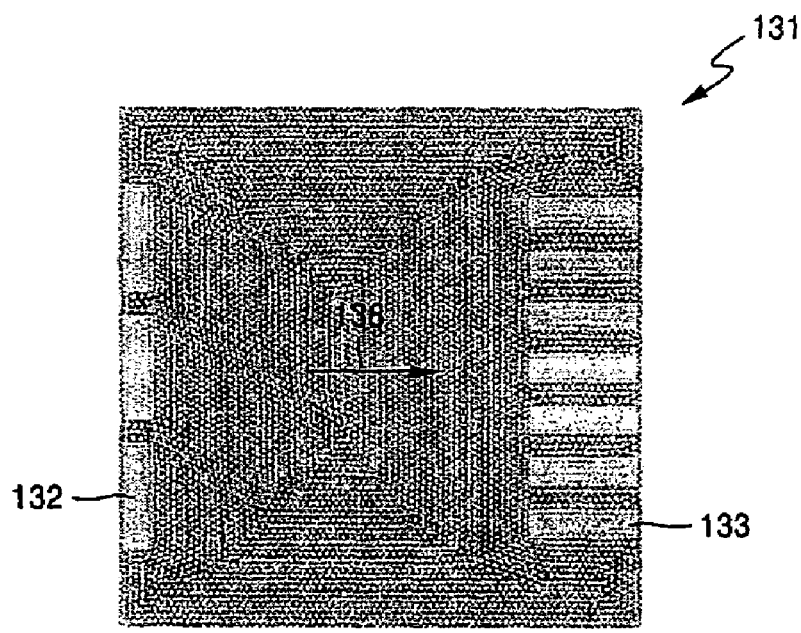
FIGS. 13A through 14B are drawings showing a magnetic thin film on which both first implants and second implants are formed, and the results of a simulation of the magnetization distribution during magnetization reversals thereof.
Figure 13B:
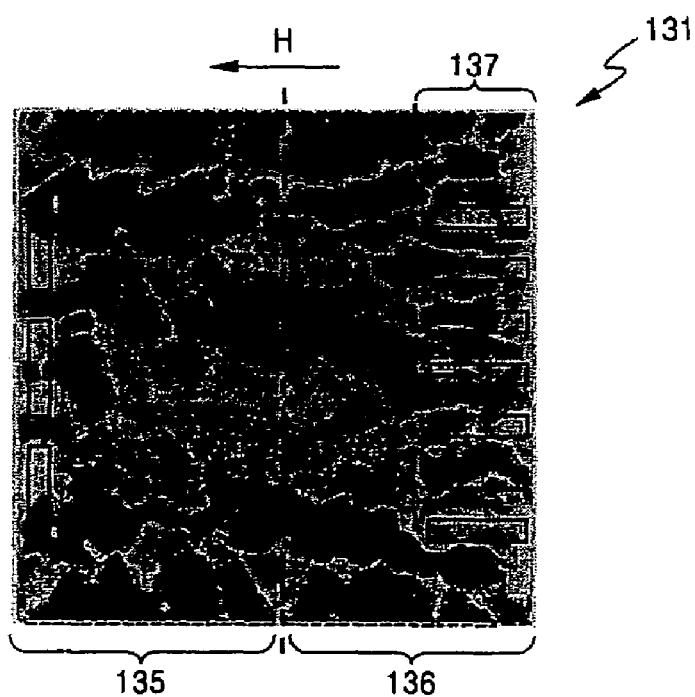

In FIG. 13A, implants in different arrangements are formed on both sides of a magnetic thin film 131 magnetized to have a magnetic moment 138 in a right direction prior to applying an external magnetic field H. When the external magnetic field H in a left direction, which is the opposite direction of the magnetic moment 138, is applied to the magnetic thin film 131, implants 132 having a long axis perpendicular to the external magnetic field H are the first implants, and implants 133 having a long axis parallel to the external magnetic field H are the second implants. FIG. 13B shows the magnetization distribution of the magnetic thin film 131 during the magnetization reversal when an external magnetic field H in the opposite direction to the magnetic moment is applied to the magnetic thin film 131. When a left region 135 in which the first implants 132 are formed is compared to a region 136 in which the second implants 133 are formed, the formation of the magnetic domain in the left region 135 is clearer than in the right region 136. This denotes that a faster magnetic domain nucleation occurs in the left region 135 than in the right region 136, since the first implants 132 act as nucleators for the formation of the magnetic domain. On the other hand, the right region 136 shows a complicated magnetic domain structure, and in particular, a region 137 in which the second implants 133 are formed shows an even more complicated magnetic domain structure. When the right region 136 is compared to the left region 135, it is seen that the second implants 133 can act as a barrier to reduce the effect of a stray field entering from the outside.

Figure 14A:
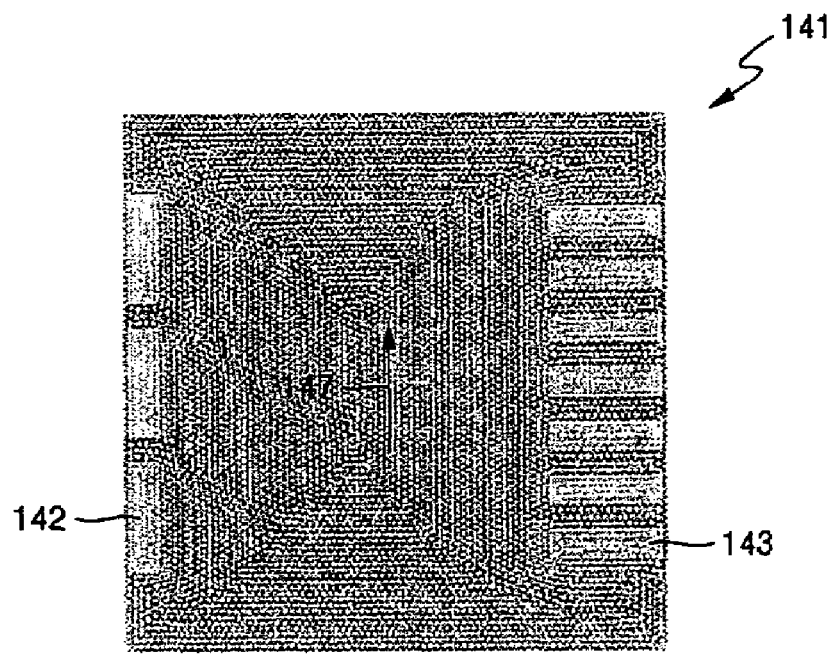

FIG. 14A shows a magnetic thin film 141 having the same shape of implants as the magnetic thin film depicted in FIG. 13A. However, the magnetic thin film 141 is magnetized to have a magnetic moment in an upward direction 147 prior to applying an external magnetic field H. When an external magnetic field H in the opposite direction to the magnetic moment is applied to the magnetic thin film 141, implants 143 having a long axis perpendicular to the external magnetic field H are the first implants and implants 142 having a long axis is parallel to the external magnetic field H are the second implants.

Figure 14B:
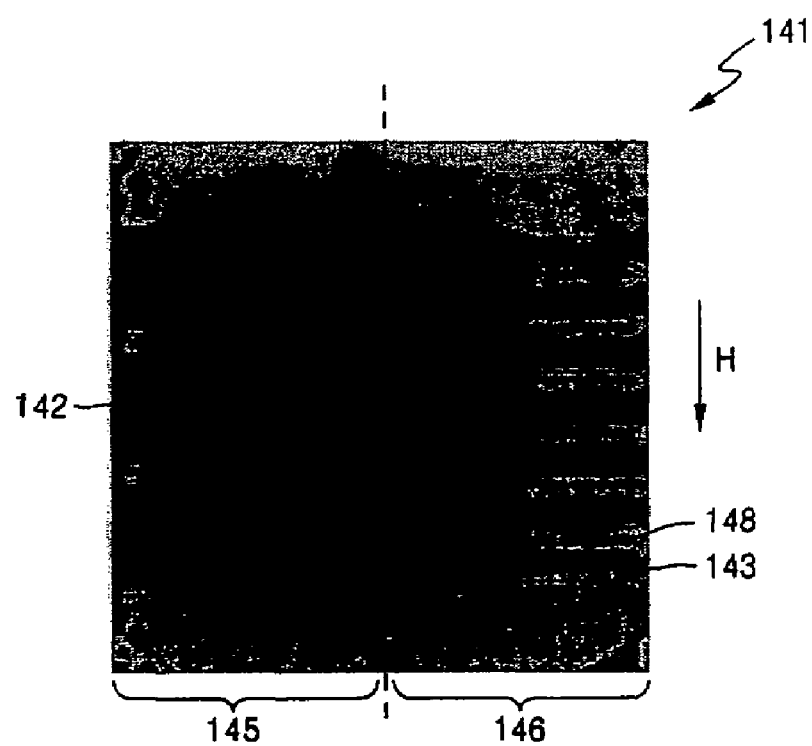

FIG. 14B shows the magnetization distribution of the magnetic thin film 141 during the magnetization reversal when an external magnetic field H in the opposite direction to the magnetic moment 147 is applied to the magnetic thin film 141. When a left region 145 in which the second implants are formed is compared to a right region 146 in which the first implants 143 are formed, the magnetization direction in the left region 145 shows almost no changes, but in the right region 146, the change of the magnetization direction is observed at the magnetic domain 148 between the first implants 143. That is, the first implants 143 act as nucleators for the formation of the magnetic domain, and the second implants 142 act as inhibitors for preventing domain motion.

According to the third embodiment of the present invention, the magnetization reversal of a magnetic head by a magnetic field applied by an induction coil is accelerated by the first implants, and the effect of the stray field entering from the outside is reduced by the second implants.

As described above, the magnetic head according to the present invention effectively reduces the effect of a stray field entering from the outside by forming implants on a magnetic thin film that constitutes first and second poles, and enables information recording at a high density by inducing high speed magnetization reversal in the first and second poles corresponding to a magnetic field applied by an induction coil.

While the magnetic head of the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A magnetic head comprising:
   a first pole;
   a second pole spaced apart from the first pole; and
   an induction coil that induces a magnetic field in the first and second poles,
   wherein the first and second poles include a pole tip in which a leakage flux for recording is generated and a head yoke that guides the flux flowing in the poles;
   at least one implant for controlling a magnetic domain, the implant formed in at least one of the first and second poles;
   said at least one implant is disposed on the at least one of the first and second poles so as to either promote magnetization reversal of the magnetic domain or to reduce effects of stray fields on the magnetic domain; and the material for forming the at least one implant is a non-magnetic material or a magnetic material having a lower saturated magnetization Ms than the head yoke.

2. The magnetic head of claim 1, wherein the at least one implant has a rectangular shape.

3. The magnetic head of claim 2, wherein the at least one implant comprises one or more first implants having a rectangular shape of which the long axis is perpendicular to the magnetic field.

4. The magnetic head of claim 3, wherein at least two first implants are arranged in at least one row parallel to the direction of the magnetic field.

5. The magnetic head of claim 4, wherein a gap between the first implants in the row of first implants is approximately equal to the width of the first implants.

6. The magnetic head of claim 4, wherein the first implants are formed in a row on a central axis of the pole, which is parallel to the direction of the magnetic field.

7. The magnetic head of claim 4, wherein the first implants are formed symmetrically on the pole with respect to the central axis of the pole, which is parallel to the direction of the magnetic field.

8. The magnetic head of claim 7, wherein the first implants are formed in two rows adjacent to both sides of the pole with respect to the central axis of the pole.

9. The magnetic head of claim 3, wherein the one or more first implants comprise a plurality of first implants formed in a region through which the induction coil passes.

10. The magnetic head of claim 3, wherein the one or more first implants are formed in the head yoke.

11. The magnetic head of claim 2, wherein the at least one implant comprises second implants having a rectangular shape of which the long axis is parallel to the magnetic field.

12. The magnetic head of claim 11, wherein at least two second implants are arranged in at least one column perpendicular to the direction of the magnetic field.

13. The magnetic head of claim 12, wherein a gap between the second implants in the column of second implants is approximately equal to the width of the second implants.

14. The magnetic head of claim 11, wherein the second implants are formed in a side of the magnetic head through which the stray fields enter.

15. The magnetic head of claim 11, wherein the second implants are formed on the head yoke.

16. The magnetic head of claim 1, wherein the non-magnetic material is $SiO_2$ or $Al_2O_3$.

17. The magnetic head of claim 1, wherein the magnetic material is NiFe, CoFe, or an alloy of Co, Fe, and Ni.

18. A magnetic head comprising:
a first pole;
a second pole spaced apart from the first pole; and
an induction coil that induces a magnetic field in the first and second poles,
wherein the first and second poles include a pole tip in which a leakage flux for recording is generated and a head yoke that guides the flux gathered at the pole tip;
one or more first implants in a rectangular shape of which the long axis is perpendicular to the magnetic field, and one or more second implants in a rectangular shape of which the long axis is parallel to the magnetic field, for controlling a magnetic domain, are formed in at least one of the first and second poles;
said one or more first implants is disposed on the at least one of the first and second poles so as to either promote magnetization reversal of the magnetic domain and said one or more second implants is disposed on the at least one of the first and second poles so as to reduce effects of stray fields on the magnetic domain; and
the material for forming the implants is a non-magnetic material or a magnetic material having a lower saturated magnetization Ms than the head yoke.

19. The magnetic head of claim 18, wherein the one or more first implants are formed in a region through which the induction coil passes.

20. The magnetic head of claim 18, wherein the one or more first implants are formed in the head yoke.

21. The magnetic head of claim 18, wherein the one or more second implants are formed in a side of the magnetic head through which the stray fields enter.

22. The magnetic head of claim 18, wherein the one or more second implants are formed in the head yoke.

23. The magnetic head of claim 18, wherein the one or more first implants are formed between a region in which the one or more second implants are formed and the pole tip region.

24. The magnetic head of claim 18, wherein the one or more first implants comprise at least two first implants that are arranged in at least one row parallel to the direction of the magnetic field.

25. The magnetic head of claim 24, wherein a gap between the first implants in the row of first implants is approximately equal to the width of the first implants.

26. The magnetic head of claim 24, wherein the one or more first implants are formed in a row on a central axis of the pole parallel to the direction of the magnetic field.

27. The magnetic head of claim 24, wherein the one or more first implants are formed in two rows adjacent to both sides of the pole with respect to a central axis of the pole parallel to the direction of the magnetic field.

28. The magnetic head of claim 18, wherein the one or more second implants are formed adjacent to a connection unit of the head yoke that magnetically connects the first and second poles.

29. The magnetic head of claim 18, wherein the one or more second implants comprise at least two second implants that are arranged in at least one column perpendicular to the direction of the magnetic field.

30. The magnetic head of claim 29, wherein a gap between the second implants in the column of second implants is approximately equal to the width of the second implants.

31. The magnetic head of claim 18, wherein the non-magnetic material is $SiO_2$ or $Al_2O_3$.

32. The magnetic head of claim 18, wherein the magnetic material is NiFe, CoFe, or an alloy of Co, Fe, and Ni.

33. The magnetic head of claim 32, wherein the magnetic material for forming the implants has a different composition from the pole material and lower saturated magnetization Ms than the pole material.

34. The magnetic head of claim 1, wherein the width of the implant has a range from 20 to 100 nanometer and the length of the implant has a range from 100 to 2000 nanometer.

* * * * *